(12) United States Patent
Fujino

(10) Patent No.: US 6,337,766 B1
(45) Date of Patent: Jan. 8, 2002

(54) STEREOSCOPIC MICROSCOPE

(75) Inventor: Takeshi Fujino, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/713,032

(22) Filed: Nov. 16, 2000

(30) Foreign Application Priority Data

Nov. 17, 1999 (JP) .......................................... 11-326591

(51) Int. Cl.⁷ .......................... G02B 21/00; G02B 21/06
(52) U.S. Cl. ...................... 359/383; 359/368; 359/392; 359/393
(58) Field of Search .......................... 359/368, 375–376, 359/379, 382–384, 391, 393

(56) References Cited

U.S. PATENT DOCUMENTS

| | | | | |
|---|---|---|---|---|
| 4,445,758 A | * | 5/1984 | Emmel | 359/383 |
| 4,676,608 A | * | 6/1987 | Faubion | 359/383 |
| 4,712,890 A | * | 12/1987 | Dobner | 359/383 |
| 5,270,855 A | * | 12/1993 | Hasegawa | 359/383 |
| 5,831,764 A | * | 11/1998 | Brinkmann et al. | 369/383 |

* cited by examiner

*Primary Examiner*—Thong Nguyen
(74) *Attorney, Agent, or Firm*—Morgan, Lewis & Bockius LLP

(57) ABSTRACT

A stereoscopic microscope comprises a body tube provided with an objective lens, a base provided with a stage on which a sample as an object to be observed is mounted, a guide mechanism for driving the body tube to change a distance between the body tube and the sample for conducting a focusing operation, a focus driving unit for transmitting the driving force to a movable portion of the guide mechanism, and a focus operating unit which can be operated externally for giving the driving force to the focus driving unit in order to drive the guide mechanism. The guide mechanism is placed on one end of the base, the focus driving unit is placed inside the base, and the focus operating unit is placed on the other end of the base.

6 Claims, 5 Drawing Sheets

STEREOSCOPIC MICROSCOPE

The present application claims the benefit of Japanese Patent Application No. 11-326591 which is hereby incorporated by reference.

BACKGROUND OF THE INVENTION

1. Field of the Invention

The present invention relates to a stereoscopic microscope, and particularly, to a stereoscopic microscope in which a microscope body tube is moved to a sample to be inspected for focusing.

2. Related Background Art

In an ordinary microscope, a focusing operation is conducted by changing a distance between a sample to be inspected and the microscope. In order to change this distance, there is employed either a method in which the position of the sample is fixed and the microscope body tube is motioned (which is called a vertical motion, since in most cases the body tube is motioned vertically), as shown in FIG. 6, or a method in which the microscope is fixed and the sample itself is vertically motioned, as shown in FIG. 7. These methods are employed for a stereoscopic microscope.

A base portion 600 in FIG. 6 is provided with a stage 600a for placing a sample thereon, and in order to inspect details of a sample having certain dimensions, it is inevitable to secure a space for the motion of the sample. For this reason, guide mechanisms 300a and 400a capable of vertical motion are disposed at positions apart from the stage 600a. A fixed stay 400 of the guide mechanisms 300a and 400a is disposed on the base portion 600, and a holding member 300 for holding the body tube 1 of the stereoscopic microscope is disposed on the side of motion of the guide mechanisms 300a and 400a.

In FIG. 6, in order to conduct a focusing operation, that is, to move the body tube 1 of the microscope vertically, a rack is formed on the guide mechanism 300a, and a pinion 500a for engaging with the rack is formed on a focusing knob 500. The rack and the pinion may be inversely disposed in the same manner.

In case of FIG. 7, in order to move the sample vertically, guide mechanisms 800a and 900a which vertically move are disposed inside the base 600, to be operated by the focusing knob 900. In this case, a microscope body tube 200 is arranged to be secured to a main body 700 of the microscope. For the guide mechanisms 800a and 900a, the rack-and-pinion structure is generally employed. Since the magnification of a stereoscopic microscope is lower than that of an ordinary microscope, and in terms of the working efficiency, the observer often holds a sample directly by his or her own hand and moves the sample for inspection. The sample to be inspected may be a minute part in the industrial field, or may be a plant or a small animal such as an insect. The sample also may be a sample in liquid such as a cultured cell floating in culture solution.

Not a few of such cubic samples have a difference in level (a level difference in the direction of the optical axis of the objective lens) which may reach several tenths millimeters to several millimeters.

In this case, in order to observe the sample in detail, it is required to raise the magnification of the microscope. However, if the magnification is set high, only a several hundredths millimeters of depth of focus can be obtained, so that with respect to the sample having a level difference not smaller than this depth of focus, two positions having such level differences can not be focused at the same time. As a result, it is required to conduct a focusing operation repeatedly for each portion to be observed. Moreover, even within the depth of focus, in order to confirm the best focus condition whenever a portion to be inspected is changed, the focusing operation may be repeatedly conducted.

Consequently, in such a stereoscopic microscope as shown in FIG. 6, (according to the method of vertically moving the body tube 200 of the microscope), it is inevitable to dispose the focusing knob 500 around the guide mechanisms 300a and 400a at a position substantially separated from the stage 600a in the depth direction. Moreover, a large vertical motion stroke is required to cope with a sample having certain height, so that it is required to dispose the focusing knob 500 considerably above the upper surface of the base 600.

When a sample having a level difference is to be observed, since a focusing operation is conducted for each portion to be observed of such sample, it is required to frequently conduct an operation for confirming the position of the focusing knob 500 and an operation for moving the operating hand in an upper depth direction, which is very irksome. Also, to raise the hand upward tires the observer.

On the other hand, in such a stereoscopic microscope as shown in FIG. 7, (according to the focus method of vertically motioning a sample to be inspected), the focusing knob 900 can be easily disposed around the stage 800, which is effective for the above-mentioned problem. However, to move the sample vertically causes undesired movement of the sample itself when the sample is floating in liquid, and disturbs the liquid surface, so as to largely deteriorate the observed image.

If the focusing knob 900 is disposed around the stage 800, and particularly, in an upper part than a surface on which the sample is placed, a probability of unprepared contact between a focus operating unit and the sample becomes high when the samples are exchanged on the stage, which may cause an accident leading to damage of the sample or, in the worst case, damage of the microscope.

SUMMARY OF THE INVENTION

In consideration of the problems described above, an object of the present invention is to provide a stereoscopic microscope which is capable of improving the operability thereof and capable of preventing unprepared contact with the focusing member (focusing knob).

According to a main aspect of the present invention, a stereoscopic microscope comprises a body tube provided with an objective lens, a base provided with a stage on which a sample as an object to be inspected is mounted, a guide mechanism for driving the body tube and changing a distance between the body tube and the sample for focusing, a focus driving unit for transmitting a driving force to a movable portion of the guide mechanism, and a focus operating unit which can be operated externally for giving the driving force to the focus driving unit in order to drive the guide mechanism, and is characterized in that the guide mechanism is placed on one end of the base, the focus driving unit is placed inside the base, and the focus operating unit is placed on the other end of the base. As a result, the operability of the stereoscopic microscope at observation is enhanced, so that it is not difficult to conduct the observation with the sample which is not swinging.

DESCRIPTION OF THE PREFERRED EMBODIMENTS

Figure 1:
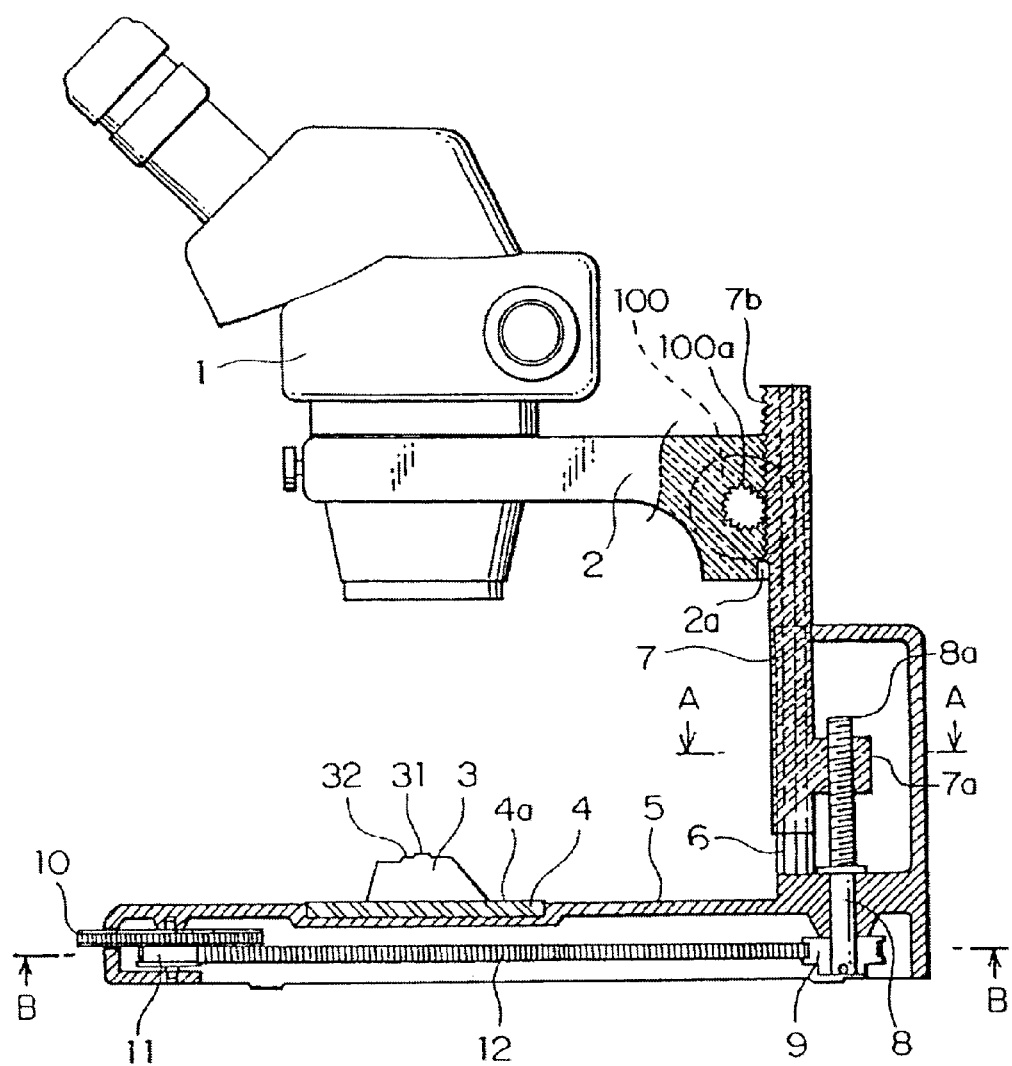
FIG. 1 is a cross-sectional view of a stereoscopic microscope acing to the first embodiment of the present invention.

According to a first preferred aspect of the present invention, the stereoscopic microscope set forth in the above main aspect is characterized in that the focus operating unit is displaced in a lower part than a surface of the stage of the base on which surface the sample is placed, which, consequently, contributes to enhancement of the operability since unprepared contact with the focus operating unit can be prevented at observation.

According to a second preferred aspect of the present invention, the stereoscopic microscope set forth either in the main aspect or in said second preferred aspect is characterized in that the guide mechanism is placed in a stay which is placed on one end of the base and is extended in the direction of the optical axis, and the focus operating unit takes the form of a dial and is placed with a part thereof exposed on the other end of the base which is the operator's side of the stereoscopic microscope and is disposed inside the base in parallel to the horizontal surfaces thereof, which, consequently, contributes to enhancement of the operability since unprepared contact with the focus operating unit can be prevented at observation.

According to a third preferred aspect of the present invention, the stereoscopic microscope set forth either in the main aspect or in the first preferred aspect is characterized in that the focus operating unit is disposed on either of the right and left sides of the base or on both of the right and left sides of the base, seen from the operator's side of said stereoscopic microscope, which, consequently, contributes to enhancement of the operability since unprepared contact with the focus operating unit can be prevented at observation.

According to a fourth aspect of the present invention, the stereoscopic microscope set forth in any one of the main aspect, the second aspect and the third aspect further comprises a second guide mechanism for driving the body tube and changing a distance between the body tube and the sample for focusing, a second focus driving unit for transmitting the driving force to a movable portion of the second guide mechanism, and a second focus operating unit for driving the second guide mechanism, and is characterized in that the second guide mechanism, the second focus driving unit, and the second focus operating unit are disposed on the guide mechanism. As a result, it is possible to conduct a focusing operation not only by the focus operating unit, but also by the second focus operation unit, so that the operator can select one of the units properly depending on the operating conditions (replacement of objective lenses, replacement of samples, a focusing operation, an operating posture), etc. Thus, the operability can be enhanced.

According to a fifth preferred aspect of the present invention, the stereoscopic microscope set forth in the fourth preferred aspect is characterized in that the drive amount pitches of the guide mechanism and the second guide mechanism are set in such a manner that the distance between the body tube and the sample changes in different amounts respectively with the guide mechanism and the second guide mechanism, and the guide mechanism is arranged for a fine motion while the second guide mechanism is arranged for a coarse motion. As a result, if the second focus operating unit and the second guide mechanism for a coarse movement are used in replacing objective lenses or in replacing samples in accordance with the operational conditions of the operator, and the focus operating unit and the guide mechanism for a fine movement are used in focusing at observation, the operability can be enhanced.

According to a sixth preferred aspect of the present invention, the stereoscopic microscope set forth in the fourth preferred aspect is characterized in that the guide mechanism and the second guide mechanism are adapted to vertically move the body tube through certain common parts. As a result, some of the parts for constituting the both guide mechanisms can be used in common, driving mechanisms can be disposed in a concentrated manner at one position, and the microscope can be arranged compactly and can be manufactured at low cost.

First Embodiment

Figure 2:
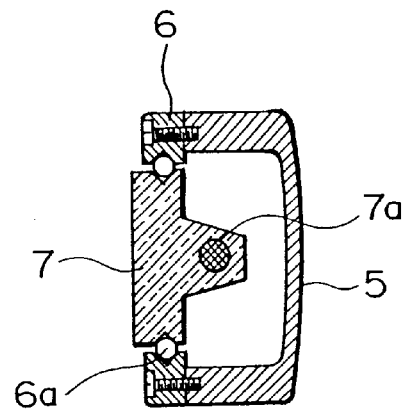
FIG. 2 is a cross-sectional view of a linear guide mechanism, taken along the line A—A indicated by arrow in FIG. 1.
Figure 3:
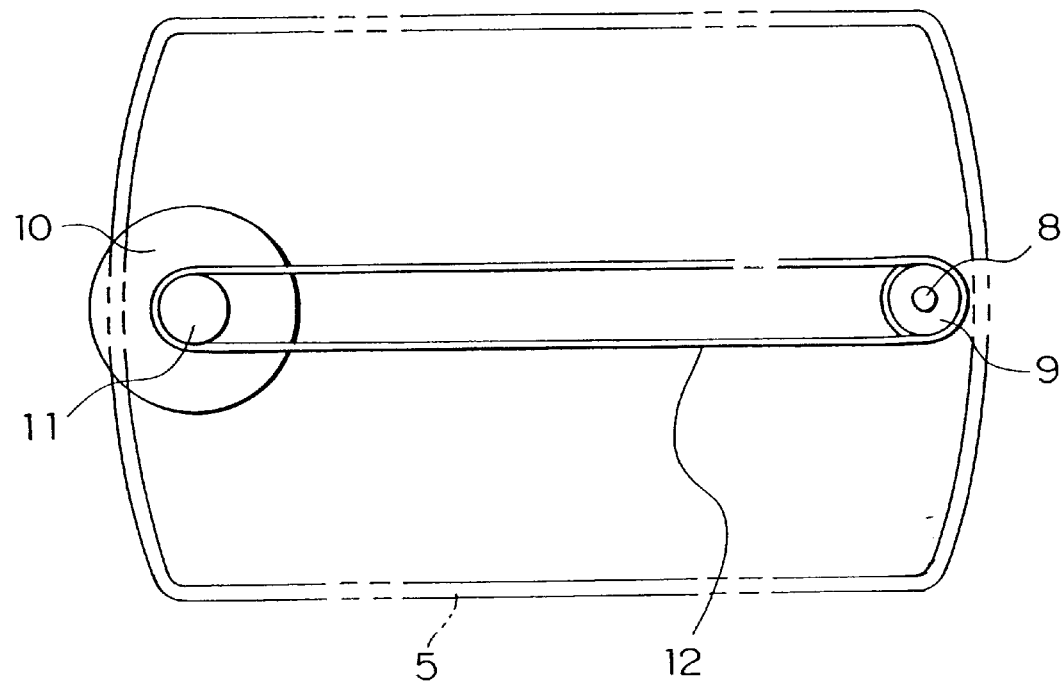
FIG. 3 is cross-sectional view, taken along the line B—B indicated by arrow in FIG. 1.

FIGS. 1 to 3 illustrate a stereoscopic microscope according to a first embodiment of the present invention, in which FIG. 1 is a cross-sectional view of the stereoscopic microscope, FIG. 2 is a view for showing a guide mechanism, taken along the line A—A indicated by arrow in FIG. 1, and FIG. 3 is a view for showing a mechanism for communicating a focus operating unit with a focus driving unit, taken along the line B—B indicated by arrow in FIG. 1.

Referring to FIG. 1 and FIG. 2, a referential numeral 1 denotes a body tube of a stereoscopic microscope, 2 denotes a holding member for holding the body tube 1 of the stereoscopic microscope, 3 denotes a sample to be observed, 4 denotes a stage for mounting the sample 3 thereon, 5 denotes a base on which the stage 4 is placed, 6 denotes a stationary member of a focusing guide mechanism (cross section thereof is shown in FIG. 2) which is secured to the base 5, and 7 denotes a movable member of the focusing guide mechanism, which is provided with the holding member 2 for holding the body tube 1 of the stereoscopic microscope.

The stationary member 6 is secured to one end of the base 5, and is a linear guide member in a fallen U-shape extending in the direction of the optical axis of an objective lens which is incorporated in the body tube 1 of the microscope.

The movable member 7 can be moved in the direction of the optical axis of the objective lens, is guided to the stationary member 6 through rolling members 6a, as shown in FIG. 2, and is provided with a female lead screw 7a at a portion thereof. This lead screw 7a is meshed with a male lead screw 8a which is provided in a portion of a focusing drive shaft 8 rotatably mounted on the base 5. The stationary member 6, the rolling members 6a, and the movable member 7 constitute a guide mechanism for a focusing operation of the body tube 1 of the microscope. The lead screws 7a and 8a constitute the focus driving unit for transmitting the driving force of the focusing operation. Here, the focusing operation means an operation for conducting a focus adjustment of the objective lens incorporated in the body tube 1 of the stereoscopic microscope by changing a distance between the body tube 1 and the sample 3.

A rack 7b is formed on the surface of the movable member 7 and a pinion 100a of a focusing knob 100 is meshed with this rack 7b in such a manner that the body tube 1 of the microscope held by the holding member 2 can be moved in the direction of the optical axis. The holding member 2 is also provided with a guide member 2a (which has the same constitution as that of the stationary member 6 in FIG. 2) in a fallen U-shape which is fitted in the outer surface of the movable member 7 through the rolling members in the same manner as in FIG. 2, in order to guide the movement of the body tube 1 of the microscope in the direction of the optical axis. The movable member 7 and the guide member 2a constitute a second guide member for a focusing operation of the body tube 1 of the microscope. This second guide mechanism functions such that the holding member 2 is vertically moved with respect to the movable member 7, and shares some of the constituent parts (7) of the guide mechanism (6, 6, 6a, 7). The rack 7b and the pinion 100a constitute a second focus driving unit for transmitting the driving force of a focusing operation.

For predetermined angles of rotation of the focusing dial 10 and the focusing knob 100, a drive amount pitch in the direction of the optical axis by the rack 7b and the * 13 pinion 100a is arranged to be larger than a drive amount pitch by the lead screws 7a and 8a, so that in a focusing operation a fine movement can be conducted by the lead screws 7a and 8a while a coarse movement can be conducted by the rack 7b and the pinion 100a.

The drive shaft 8 is disposed at one end of the base 5 to be rotatable. A pulley 9 for a toothed belt is fixed to the end opposite to the lead screw 8a.

Referring to FIG. 3, the focusing dial 10 is rotatably disposed at the center of the end facing the end of the base 5 on which the movable member 7 is mounted, and is disposed in a lower part than the stage 4, as being partially exposed from the base 5 so as to be operated externally. Then, a pulley 11 for the toothed belt is fixed also to this focusing dial 10.

The two pulleys 9 and 11 are disposed inside the base 5, and are connected to each other by the toothed belt 12 for transmitting the rotation driving force to the focusing drive shaft 8.

The driving force transmitting members including the focusing dial 10, the pulleys 9 and 11, and the toothed belt 12 are disposed inside the base 5 in parallel to the horizontal surfaces thereof, and are arranged to be received compactly.

Referring to FIG. 1, the focusing knob 100 is disposed above the stage 4 of the base 5, at a position separated from the user of the stereoscopic microscope, with respect to the optical axis of the objective lens. On the other hand, the focusing dial 10 is disposed below the stage 4, at a position near the user, with respect to the optical axis of the objective lens.

The first embodiment is arranged as described above.

Next, the operation of the stereoscopic microscope will be described.

In the stereoscopic microscope, it is required to replace objective lenses in the body tube 1, or to make a large space between the body tube 1 and the base 5 when the sample 3 is to be replaced. It is also required to roughly focus the sample 3 to be inspected.

The body tube 1 of the microscope can be vertically moved largely by the focusing knob 100 with one operation, since the drive amount pitch of the focusing knob 100 is set to be large. Thus, in such a case, the focusing knob 100 is operated in order to vertically move the body tube 1 of the microscope promptly. With an operation of the focusing knob 100, the holding member 2 for holding the body tube 1 with respect to the movable member 7 is driven at a large drive amount pitch by a drive mechanism of the pinion 100a and the rack 7b, thereby conducting the vertical motion of the body tube 1 of the microscope. In this case, the movable member 7 stands still to play the role of the fixed member of the drive mechanism.

After that, the sample 3 has to be focused with precision in order to be inspected. In this case, however, if the body tube 1 of the microscope is moved largely with one operation, the focusing operation can not be conducted smoothly. Also, the stereoscopic microscope is often used to inspect a sample 3 having a cubic difference in level. Thus, the observer may, after observing an observing point 31 of the sample 3, observe another observing point 32 by moving the sample 3. The focusing operation can not be conducted smoothly also in this case.

Accordingly, in such a case, the focusing operation can be finely adjusted by operating the focusing dial 10. With rotation of the focusing dial 10, the driving force is transmitted to the pulley 11, the toothed belt 12, and the pulley 9 in this order, so as to rotate the drive shaft 8.

The rotation of the drive shaft 8 is converted into a vertical motion of the movable member 7 with respect to the fixed member 6 owing to a threadable engagement between the male lead screw 8a disposed on the drive shaft 8 and the female lead screw 7a disposed on the movable member 7 of a linear guide mechanism. The movable member 7 is not rotated, but is driven straight, by the linear guide which consists of the fixed member 6 and the rolling member 6a. Then, consequently, the holding member 2 disposed on the movable member 7 and the body tube 1 of the microscope are vertically moved in a body at a small drive amount pitch with respect to the base 5. Since the focusing dial 10 is thus rotated, the focusing operation by a fine movement is conducted.

Since this focusing dial 10 is disposed on the inspector's side (roughly within a range of 20 cm) of the sample observing position (the optical axis of the objective lens), the position of the focusing dial 10 can be easily recognized by touch when moving the sample or operating the focusing dial 10.

Consequently, the observer is not required to always confirm the position of the focusing dial 10 with the eye while looking through the body tube 1 of the microscope for observation. Thus, the observer can conduct the focusing operation while keeping his or her posture of observation with the eye fixed to the microscope, thereby improving the efficiency of observation.

There is also an advantage in that the focusing dial 10 is disposed on the base 5 and does not occupy a large space on the desk.

When the focusing dial 10 is disposed at the center of the front surface (on the inspector's side) of the base 5, the observer can operate this dial either with the right hand or with the left hand under the same condition.

Since the focusing dial 10 is disposed on the base in a lower part than a sample mount surface 4a, it is possible to reduce the probability of unprepared contact between the sample 3 and the focusing dial 10 during an operation for replacing the sample 3 with another sample.

Second Embodiment

Figure 4:
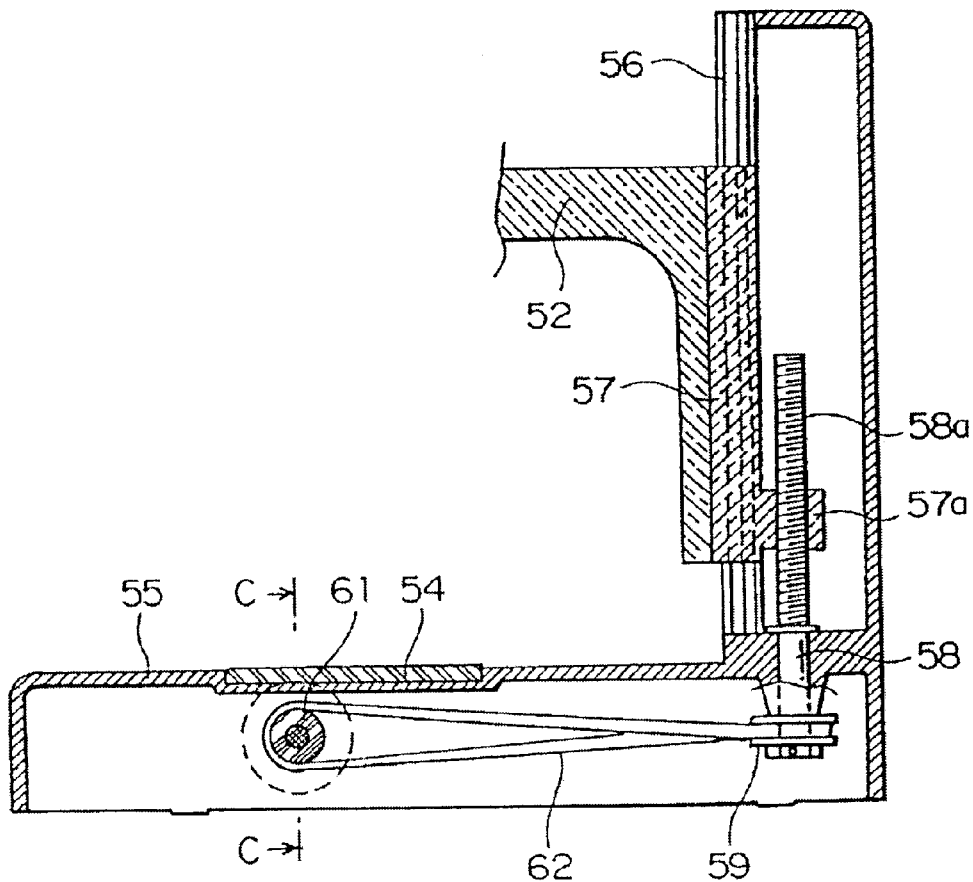
FIG. 4 is cross-sectional view of a stereoscopic microscope according to the second embodiment of the present invention.
Figure 5:
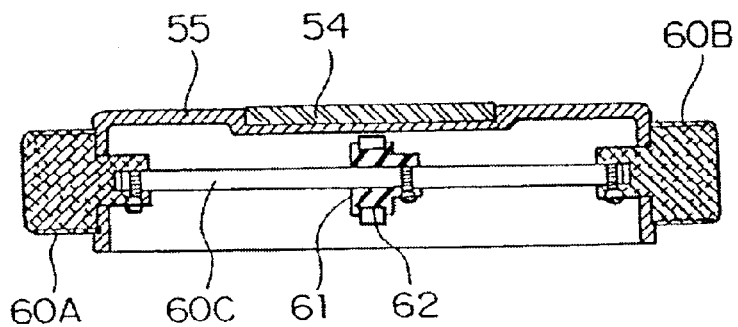
FIG. 5 is a cross-sectional view, taken along the line C—C indicted by arrow in FIG. 4.
Figure 6:
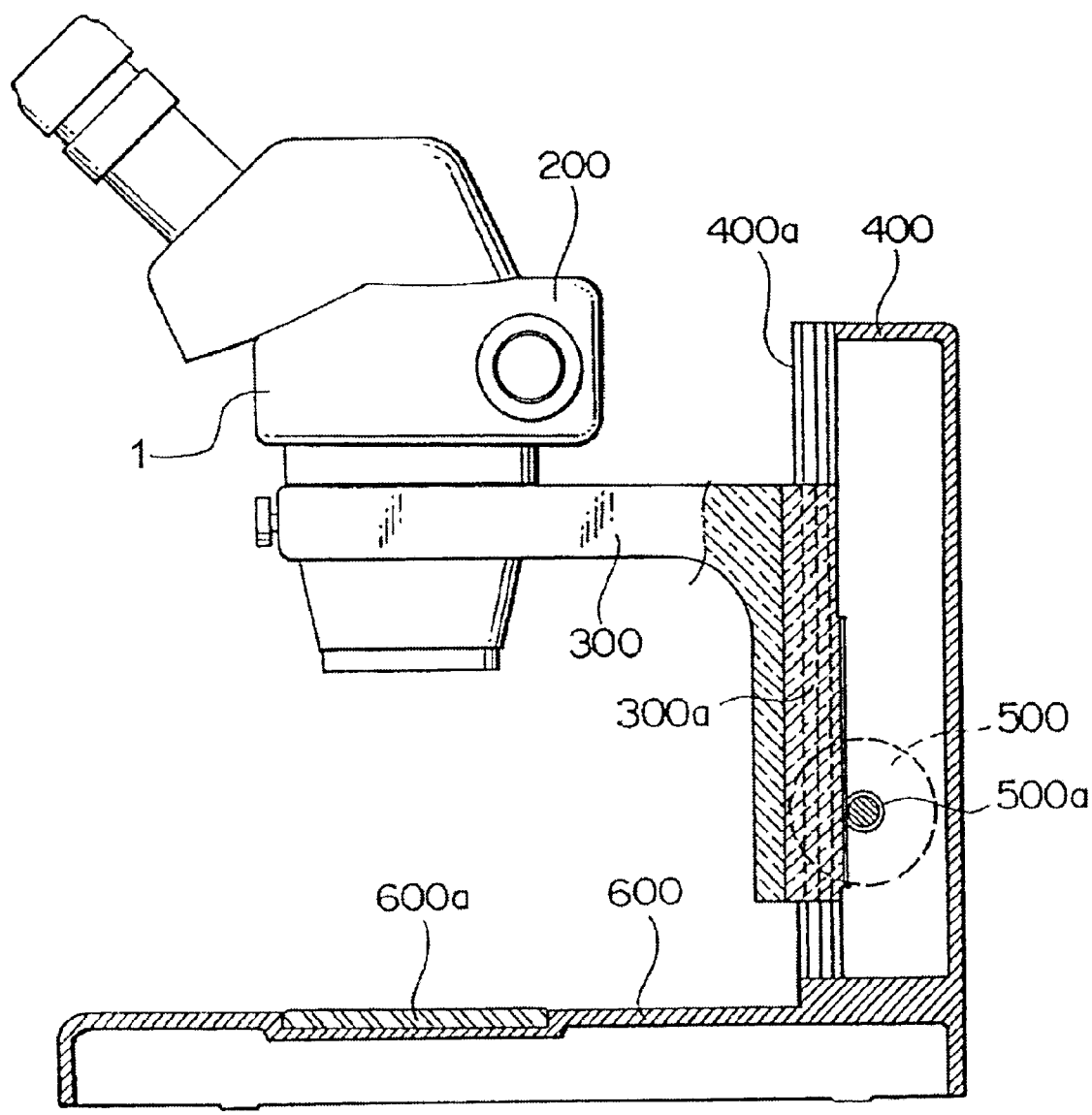
FIG. 6 is a cross-sectional view of a conventional stereoscopic microscope.
Figure 7:
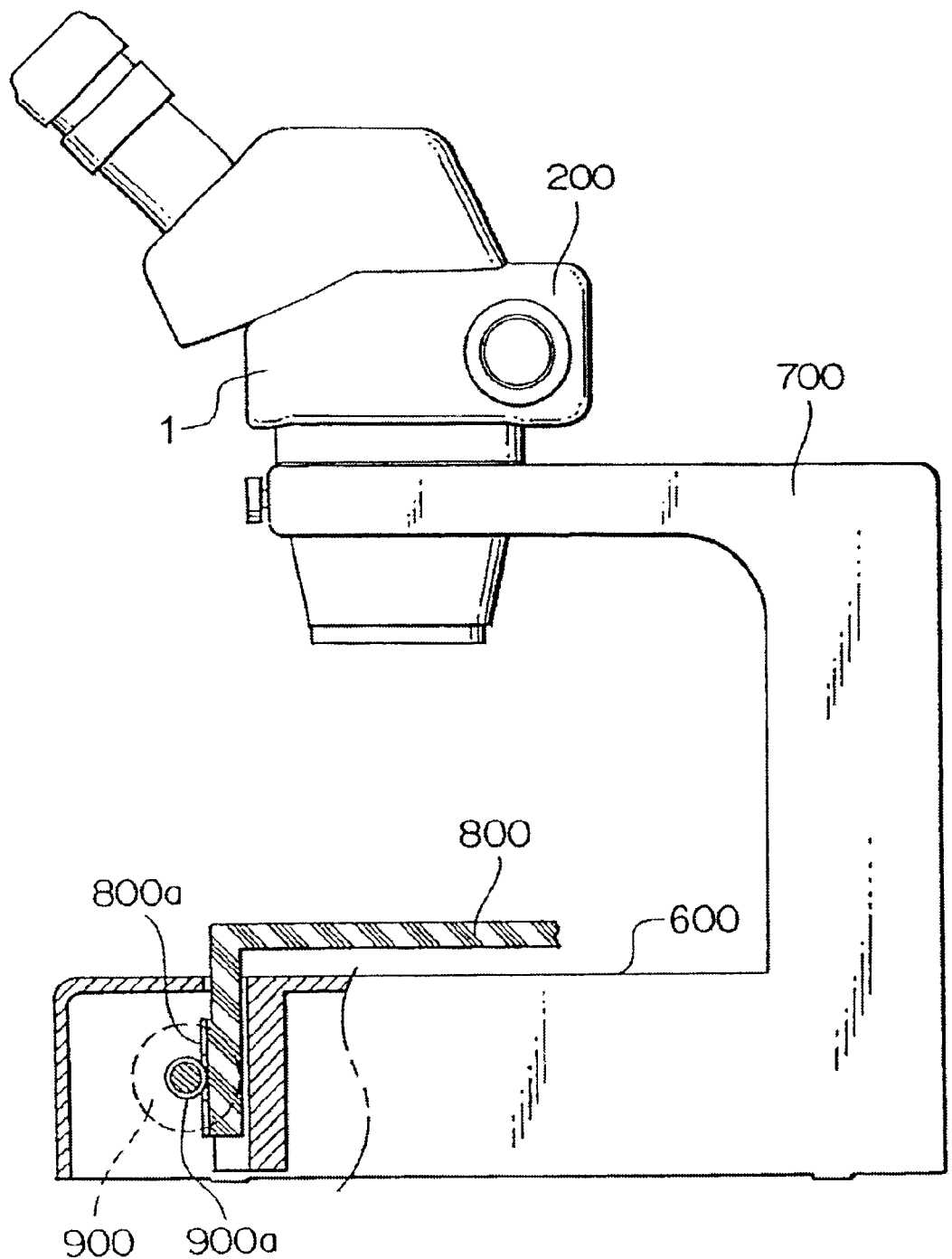
FIG. 7 is a cross-sectional view of another conventional stereoscopic microscope.

FIG. 4 and FIG. 5 illustrate a second embodiment of the present invention, in which FIG. 4 is a cross-sectional view of the stereoscopic microscope, for mainly showing a focus operating unit and a focus driving unit, while FIG. 5 is a cross-sectional view, taken along line C—C indicated by arrow in FIG. 4. The second embodiment is different from the first embodiment only in that focusing knobs 60A, 60B are provided, instead of the focusing dial 10. The other arrangements are the same as those of the first embodiment. For example, 52 denotes a holding member for holding the body tube (not shown) of the stereoscopic microscope, 57 denotes a movable member of the focusing guide mechanism which is provided with the holding member 52 for holding the body tube, 56 denotes a stationary member, and 57a and 58a denote female and male lead screws, respectively.

A pulley 59 for a toothed belt is secured to a focusing drive shaft 58. The focusing knobs 60A, 60B are integrated by a coupling shaft 60C and are rotatably disposed on the right and left sides of the base 55 near a stage 54. A focusing pulley 61 is secured to the coupling shaft 60C, and the two pulleys 59 and 61 are communicated with each other by a toothed belt 62.

With such arrangement, the observer can conduct a focusing operation by his or her skillful hand or, depending on the form of a sample to be inspected, either hand which is more convenient in the case.

Though not illustrated, under the limited condition of observation, the space occupied by the microscope on the desk can be reduced by employing the structure having either right or left focusing knob, whereby the desk space can be effectively used.

In the foregoing embodiments, the toothed belt is used for communication between the focus operating unit (focusing knob, the focusing dial, etc.) and the focus driving unit. However, another operation transmitting mechanism utilizing a steel wire, a gear train, a link mechanism, or the like, may be employed, instead of the toothed belt. Also, with employment of a motor for the focus driving unit, an operation instruction from the focus operating unit can be issued electrically, and the communication between the focus operating unit and the focus driving unit can be conducted only by electric connection (wiring), whereby a degree of freedom in positioning the focus operating unit can be enhanced.

As described above, the stereoscopic microscope according to the present invention has advantages that when details of a cubic sample having a level difference are to be observed, if an out-of-focus state occurs due to a movement of the sample, the observer can conduct the observation without always confirming the position of the focus operating unit with the eye and that the observer does not need to raise the hand from the desk higher than necessary, which lightens the observer's fatigue. Also, since the safety in the sample replacing work is taken into consideration, the mental strain of the observer is lightened in this respect.

According to the stereoscopic microscope of the present invention, it is arranged such that the main body of the microscope can be driven by the focus operating unit provided at the other end of the base, so that the operability of the stereoscopic microscope in the observation is enhanced, and the observation does not become difficult because of swinging of the observed sample.

According to the stereoscopic microscope of a first preferred aspect of the present invention, the focus operating unit is disposed lower than the sample mount surface of the stage of the base, so that the observer does not carelessly contact the focus operating unit, which contributes to improvement of the operability.

According to the stereoscopic microscope of the second preferred aspect of the present invention, the guide mechanism is disposed in the stay which is disposed at one end of the base and is extended in the direction of the optical axis, and the focus operating unit is disposed at the other end of the base which is the operator's side of the stereoscopic microscope with a part thereof exposed.

As a result, the operator does not carelessly contact the focus operating unit, which contributes to improvement of the operability.

According to the stereoscopic microscope of the third preferred aspect of the present invention, the focus operating unit is disposed either on the right side or on the left side of the base, or on the both sides of the base, seen from the operator's side of the stereoscopic microscope. As a result, the operator does not carelessly contact the focus operating unit, which contributes to improvement of the operability.

According to the fourth preferred aspect of the present invention, the stereoscopic microscope further comprises the second guide mechanism for driving the body tube of the microscope to change the distance between the body tube and the sample, thereby conducting a focusing operation, the second focus driving unit for transmitting the driving force to the movable portion of the second guide mechanism, and the second focus operating unit for driving the second guide mechanism; and the second guide mechanism, the second focus driving unit and the second focus operating unit are disposed on the guide mechanism, whereby it is possible to conduct a focusing operation not only by the focus operating unit, but also by the second focus operating 3 unit. Thus, the operator can select a proper unit in accordance with the operating conditions (exchange of objective lenses, exchange of samples, a focusing operation, an operating posture, etc.) of the operator, which contributes to the enhancement of the operability.

According to the stereoscopic microscope of the of fifth preferred aspect of the present invention, the drive amount pitches of the guide mechanism and the second guide mechanism are set in such a manner that the distance between the body tube and the sample changes in different amounts respectively with the guide mechanism and the second guide mechanism, and the guide mechanism is arranged for a fine motion while the second guide mechanism is arranged for a coarse motion. Thus, if the operator uses the second focus operating unit and the second guide mechanism for a coarse movement when objective lenses or samples are exchanged, and the focus operating unit and the guide mechanism for fine movement for focusing at observation, in accordance with the operating conditions of the operator, the operability can be enhanced.

According to the stereoscopic microscope of the sixth preferred aspect of the present invention, the guide mechanism and the second guide mechanism can share some of the common constituent parts, the driving mechanisms can be disposed in a concentrated manner in one place, and the microscope can be arranged to be compact and can be manufactured at low cost.

What is claimed is:

1. A stereoscopic microscope comprising:
   a body tube provided with an objective lens;
   a base which is provided with a stage on which a sample as an object to be inspected is mounted;
   a guide mechanism for driving said body tube and changing a distance between said body tube and said sample so as to conduct focusing;
   a focus driving unit for transmitting a driving force to a movable portion of said guide mechanism;
   a focus operating unit which can be operated externally for giving the driving force to said focus driving unit in order to drive said guide mechanism, wherein said guide mechanism is placed on one end of said base, said focus driving unit is placed inside said base, and said focus operating unit is placed on the other end of said base;

a second guide mechanism for driving said body tube and changing the distance between said body tube and said sample so as to conduct focusing;

a second focus driving unit for transmitting a second driving force to a movable portion of said second guide mechanism; and a second focus operating unit for driving said second guide mechanism, wherein said second guide mechanism, said second focus driving unit, and said second focus operating unit are disposed on said guide mechanism.

2. A stereoscopic microscope according to claim 1, wherein said guide mechanism is arranged for a fine motion while said second guide mechanism is arranged for a coarse motion.

3. A stereoscopic microscope according to claim 1, wherein said guide mechanism and said second guide mechanism are adapted to vertically move said body tube through several common parts.

4. A stereoscopic microscope comprising:

a body tube provided with an objective lens;

a base provided with a stage on which a sample as an object to be inspected is mounted;

a guide mechanism which includes a stationary portion fixed at an end portion of said base and elongated along the direction of an optical axis of said objective lens, and a movable portion which is supported to said stationary portion movably along said optical axis to drive said body tube so that a distance between said body tube and said stage is changed to conduct focusing;

a drive shaft rotatably provided at said end portion of said base and elongated along said optical axis, said drive shaft being in engagement with said movable portion of said guide mechanism so that rotation of said drive shaft moves the movable portion along said optical axis;

an operation dial provided in said base at an operator's side of said base to be partially exposed so that the dial is manually operated by an operator; and a belt connecting between said dial and said drive shaft to transmit rotation from the dial to the drive shaft.

5. The stereoscopic microscope according to claim 4, wherein:

said operation dial is rotatable about an axis which is parallel to a rotation axis of said drive shaft.

6. The stereoscopic microscope according to claim 4, wherein:

said operation dial is partially exposed at an end portion of the base, which portion is closest to the operator.

* * * * *